US007227671B2

(12) United States Patent
Zolla et al.

(10) Patent No.: US 7,227,671 B2
(45) Date of Patent: Jun. 5, 2007

(54) MOTION PICTURE WATERMARKING USING TWO COLOR PLANES

(75) Inventors: Robert J. Zolla, Rochester, NY (US); Paul W. Jones, Churchville, NY (US); J. Allen Heath, Victor, NY (US); Scott P. MacKenzie, Brockport, NY (US); Thomas F. Powers, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 71 days.

(21) Appl. No.: 10/807,491

(22) Filed: Mar. 23, 2004

(65) Prior Publication Data

US 2005/0215293 A1 Sep. 29, 2005

(51) Int. Cl.
*H04N 1/56* (2006.01)
*B41M 3/10* (2006.01)

(52) U.S. Cl. ...................... 358/3.28; 358/530; 283/113

(58) Field of Classification Search ............... 358/3.28, 358/1.9, 526, 530; 283/113; 235/494, 469; 382/100; 355/40; 352/44, 55
See application file for complete search history.

(56) References Cited

U.S. PATENT DOCUMENTS 5,118,526 A * 6/1992 Allen et al. ................. 427/161
5,291,243 A * 3/1994 Heckman et al. .............. 399/3
5,752,152 A 5/1998 Gasper et al.
5,809,139 A 9/1998 Girod et al.
5,901,178 A 5/1999 Lee et al.
5,991,426 A 11/1999 Cox et al.
6,026,193 A 2/2000 Rhoads
6,239,818 B1 5/2001 Yoda
6,438,231 B1 8/2002 Rhoads
6,449,379 B1 9/2002 Rhoads
2003/0012569 A1 1/2003 Lowe et al.
2003/0030271 A1* 2/2003 Wicker ........................ 283/113
2005/0167505 A1* 8/2005 Kim et al. .................. 235/494
2005/0179765 A1* 8/2005 Jones et al. ................. 347/225

FOREIGN PATENT DOCUMENTS

WO WO 01/35323 A1 5/2001

OTHER PUBLICATIONS

J. Lubin et al., "Robust, content-dependent, high-fidelity watermark for tracking in digital cinema," in *Security and Watermarking of Multimedia Contents V*, Proc. SPIE, vol. 5020, Jan. 24, 2003.

* cited by examiner

*Primary Examiner*—Scott A. Rogers
(74) *Attorney, Agent, or Firm*—Peyton C. Watkins

(57) ABSTRACT

The present invention provides a method for recording a watermark pattern on a color recording medium that forms an image using a number N of colorants, the method comprising the step of forming the watermark pattern using at least two colorants, but fewer than N colorants.

9 Claims, 7 Drawing Sheets

MOTION PICTURE WATERMARKING USING TWO COLOR PLANES

CROSS-REFERENCE TO RELATED APPLICATIONS

Reference is made to the following commonly assigned disclosures: "Method and Apparatus for Watermarking Film" by Roddy et al., U.S. Ser. No. 10/364,488, filed Feb. 11, 2003; "Method Of Image Compensation For Watermarked Film" by Zolla et al., U.S. Ser. No. 10/742,167, filed Dec. 19, 2003; and "Watermarking Method for Motion Picture Image Sequence" by Jones et al., U.S. Ser. No. 10/778,528, filed Feb. 13, 2004, incorporated herein by reference.

FIELD OF THE INVENTION

The invention relates generally to the field of image watermark application onto color recording media and more particularly relates to a watermarking method that records a watermark pattern using some, but not all, colorant layers in a photosensitive medium such as a motion picture film.

BACKGROUND OF THE INVENTION

An unfortunate result of technological advances in image capture and reproduction is illegal copying and distribution of image content, in violation of copyright. One solution for counteracting illegal copying activity is the use of image watermarking as a forensic tool. Sophisticated watermarking techniques enable identifying information to be encoded within an image. A digital watermark can be embedded in the image beneath the threshold of visibility to a viewer, yet be detectable under image scanning and analysis. As just a few examples: U.S. Pat. No. 6,239,818 (Yoda), discloses embedding a pattern in a color print and adjusting cyan, magenta, yellow, black (CMYK) values such that the embedded data matches the color of the surround when viewed under a standard illuminant; commonly assigned U.S. Pat. No. 5,752,152 (Gasper et al.) discloses a pattern of microdots, less than 300 μm in diameter, for marking a photographic print that is subject to copyright.

Illegal copying is a particular concern to motion picture studios and distributors, representing a noticeable source of lost revenue. Watermarking of motion picture images would enable the source of an illegal copy to be tracked and would thus provide a deterrent to this activity. Watermarking techniques for still images and prints, however, may not be well-suited to motion picture film media. An encoded pattern that might not be easily visible within the single image of a print could become visible and annoying if it appears in a sequence of image frames. Moreover, a motion picture watermark must be detectable from a copy, such as a videotape copy, that is typically captured in a timing sequence that varies from the timing of motion picture frames through projection equipment and with varying image resolution, lighting, and filtering. For these and related reasons, motion picture watermarking requires a special set of techniques beyond those normally applied for still images.

A number of watermarking methods for motion images have been described in prior art patents and technical literature. Included are methods that apply a spatial-domain or frequency-domain watermark. In either approach, many techniques make use of a pseudo-random noise (PN) sequence in the watermark generation and extraction processes. The PN sequence serves as a carrier signal, which is modulated by the original message data, resulting in dispersed message data (that is, the watermark) that is distributed across a number of pixels in the image. A secret key (termed a "seed value") is commonly used in generating the PN sequence, and knowledge of this key is required to extract the watermark and the associated original message data.

Among prior art patents that address watermarking methods for motion picture image content are U.S. Pat. No. 5,809,139 issued Sep. 15, 1998 to Girod et al. entitled "Watermarking Method and Apparatus for Compressed Digital Video"; U.S. Pat. No. 5,901,178 issued May 4, 1999 to Lee et al. entitled "Post-Compression Hidden Data Transport for Video"; and U.S. Pat. No. 5,991,426 issued Nov. 23, 1999 to Cox et al. entitled "Field-Based Watermark Insertion and Detection". However, the methods disclosed in these patents can be applied only to a digital video data stream and are not directly applicable to motion picture film.

U.S. Pat. No. 6,026,193 issued Feb. 15, 2000 to Rhoads, entitled "Video Steganography", discloses the basic concept of using multiple watermarked frames from an image sequence to extract the watermark with a higher degree of confidence than would be obtained with only a single frame. U.S. Pat. No. 6,449,379 to Rhoads entitled "Video steganography methods avoiding introduction of fixed pattern noise" proposes an improvement to this scheme by changing the PN carrier from frame to frame, for example.

Another approach to applying a watermark without the disadvantages of a fixed watermark pattern is to use a three-dimensional watermark pattern. An example of such a method can be found in a paper by J. Lubin et al, "Robust, content-dependent, high-fidelity watermark for tracking in digital cinema," in *Security and Watermarking of Multimedia Contents V*, Proc. SPIE, Vol. 5020, Jan. 24, 2003. This paper discusses a method for embedding, into successive image frames, a watermark containing low frequency content in both the spatial and temporal dimensions. The method described by Lubin et al. may provide a temporally distributed watermark that is relatively robust. However, this method suffers from a key limitation for temporally distributed watermarking schemes: the requirement for temporal synchronization in order to recover or decode the watermark. That is, some method must be provided that allows indexing of each image frame with a reference frame; a sampling of successive image frames must include this reference in order to allow synchronization of watermarked frames and subsequent decoding. Significantly, the method described by Lubin et al. requires prior knowledge of the image content before application of a watermark is possible. Thus, this method would not be suitable for use as a pre-exposure scheme by a film manufacturer.

While a number of different approaches have been attempted for watermark application to motion pictures, there is considered to be room for improvement. Specifically, for motion picture film media that is watermarked using an exposure of a watermark pattern, there are limitations to these conventional approaches with respect to the color information of the watermark pattern itself. In relation to this color information, conventional approaches fail to consider one or more of the following problems:

(1) the inherent sensitivity of motion picture film media to different colors;

(2) the effect of a watermark exposure on the sensitometric response of the film; and, (3) the color processing and associated distortions that can occur when a motion picture is illegally captured using a camcorder and subsequently distributed using compression techniques such as MPEG.

In many watermarking techniques for color media, the watermark pattern is exposed using all three color planes (Red, Green, and Blue, referred to as RGB). Stated alternately, the watermark pattern is exposed onto all three colorants, such as dye layers (cyan, magenta, and yellow, referred to as CMY) for a photosensitive medium. This approach can provide a watermark with a neutral color that is substantially robust with respect to the various color distortions that can occur during illegal capture and distribution. However, while a three-color watermark exposure may work suitably for many types of color film and print media, there are problems specific to motion picture print films. In this class of film types, the respective photosensitive emulsions that are used to provide each of the three RGB color planes vary significantly in sensitivity. For most types of motion picture print film, the photosensitive emulsions for color printing that are sensitized to Green and Blue light are more sensitive to exposure energy than is the emulsion that is sensitized to Red light. Because of this, depending upon the writing technology that is employed to provide the watermark exposures, it may be difficult to achieve the necessary exposure levels for all three photosensitive emulsions. This problem is particularly pronounced for high-speed fabrication of motion picture print film.

As is well known in the imaging arts, the primary (additive) RGB colors are formed by imaging onto their complementary (subtractive) cyan, magenta, and yellow (CMY) colorant dye layers. Parts of the image that are not Red are imaged in the cyan dye layer. Parts of the image that are not Green are imaged in the magenta dye layer. Parts of an image that are not Blue are imaged in the yellow dye layer. Referring to the color sensitivity chart in FIG. 1, with sensitivity graphed on a $\log_{10}$ scale, the magenta and yellow colorant dye layer sensitivity curves for Blue and Green color planes show a marked increase in response to exposure energy over the cyan (Red-sensitized) curve. For some types of watermark application, the need for higher exposure levels for the Red color plane would not be a drawback. However, where speed is important, such as for pre-exposure of a watermark during film manufacture, for example, the low sensitivity of the cyan dye producing Red layer could slow the pre-exposure process or require high-energy exposure sources in the Red spectrum.

An additional problem relates to the impact of watermark application on image quality. The exposure of a conventional neutral watermark pattern onto a color photosensitive medium adds an overall density to each of the three RGB color planes. This effect changes the sensitometric response of the film to the actual scene content exposure and may even render image quality unsuitable, due to unwanted color shifts and tone scale distortion, unless appropriate corrections are made.

The density-to-log-exposure (D log E) graph of FIG. 4 compares sensitometric characteristics of one sensitized layer of a print film with and without a pre-exposed watermark. A curve 30*a* shows normal D log E response of an unexposed film layer. A curve 30*b* shows this response when a watermark pattern has been pre-exposed on the film layer. A third curve 30*c* shows the sensitometry adjustment needed to compensate for watermark exposure. This adjustment is carried out by changing emulsion response characteristics for the particular dye layer of the print film.

As disclosed in co-pending applications "Method and Apparatus for Watermarking Film" by Roddy et al., U.S. Ser. No. 10/364,488 and "Method Of Image Compensation For Watermarked Film" by Zolla et al., U.S. Ser. No. 10/742,167, cited above, a preferred approach to compensate for this problem is to reformulate the photosensitive emulsions, correcting for the watermark exposure and response, as shown in the example of FIG. 4, in order to provide the same effective response to image content exposure as if there were no watermark exposure. Using this approach, if a neutral watermark is produced by exposing all three color planes with a watermark pattern, it is then necessary to re-formulate all three photosensitive emulsions. It must be observed that emulsion reformulation is a difficult process, requiring careful process adjustments and testing, potentially adding considerable expense to the manufacturing process.

One solution that has been proposed for other types of color photosensitive medium is to apply a watermark only to a single color plane. This is the approach, for example, disclosed in U.S. Pat. No. 5,752,152 (Gasper et al.) where only Blue exposure is used for marking a photosensitive medium. Blue exposure results in a yellow watermark pattern, which is known to be less visible to a human observer than watermark patterns using other colors or a neutral color. However, while this method works well for its intended application, such a single-color watermark would not be particularly robust against the color processing and imaging distortions that are typically introduced during the illegal capture and distribution of motion pictures. The camcorder itself is often less sensitive to color in specific channels, due to an unequal distribution of Red, Green, and Blue sensing elements, as is described subsequently. Moreover, compression techniques such as MPEG use a luminance/chrominance color representation, discarding at least some portion of the chrominance information, because it is less perceptible to a human observer. Even if a different color plane is used, this single-channel method may not provide satisfactory results. Detection of a watermark pattern encoded in only a single color may be difficult, depending upon scene content. As a result, a single-color watermark exposure may not persist in a copy that is illegally made, thus rendering the watermark useless for the purpose of tracking stolen content.

Referring specifically to motion picture print film, another problem with watermark exposure in the Red color plane relates to the encoding of the audio signal on the film. A length of motion picture print film provides not only image content, but also provides accompanying audio soundtracks and synchronization information. Referring to FIG. 2, there is shown a small segment of 35 mm motion picture film having successive image frames 12 plus a number of tracks of encoded audio, and an interframe space 16, is positioned between successive image frames 12. An analog sound track 18 is printed between the side edge of frames 12 and perforations 14. A DTS (Digital Theater Systems) soundtrack 26 is encoded between frames 12 and analog sound track 18. A Dolby digital sound track 22 uses areas interspersed between perforations 14, repeated on both sides. Another digital sound track 24, conventionally the standard SDDS (Sony Dynamic Digital Sound) track is encoded along edges of print film 10. Digital sound tracks 22 and 24 are redundant, typically appearing on both sides of print film 10 as indicated by digital sound tracks 22' and 24'. For considerations of watermark application, it is significant to observe that analog sound track 18 and digital sound tracks 22, 24, and 26 are encoded onto print film 10 using exposure to light, in much the same way as frames 12 are exposed. For this reason, any imperfection in imaging quality of print film 10 may also impact audio quality. Film grain, dust, surface imperfections, and other imaging anomalies not only degrade image quality, but may also have an impact on audio quality.

Due to the requirements of traditional sensing circuitry using vacuum tubes, the colorant dye layers of early color motion picture films were unable to provide sufficient density for accurately encoding the audio signal. To remedy this situation, special processing has been used so that metallic silver content along analog sound track 18 is not bleached from the film surface. This special processing step allows analog sound track 18 to have higher density to IR radiation than film dyes alone could provide. More modern improvements to analog sensing circuitry, retrofitted to a large number of early projection units, now allow the use of dye-only sound tracks. This results in cost savings, since the added procedures are no longer needed for restoring metallic silver compounds to the area of analog sound track 18 for these projectors. Instead of reading a highly dense, silver-bearing analog sound track 18 imprinted on the film, the newer solid-state detection circuitry reads analog sound encoding in the cyan dye layer that provides absorption of light in the Red region. This means, however, that there is heightened sensitivity to Red wavelengths, blocked most effectively by cyan dye in the audio track. Thus, any type of watermarking signal having density in the Red spectral region could have an adverse affect on the encoded audio signal of analog sound track 18.

A further complication, related to this problem with Red color content, is that there is no pre-determined orientation of frames and analog sound track 18 and DTS sound track 26 for unexposed film. As the film is shipped from the manufacturer, one orientation may be more likely than its opposite; however, either negative or print film may be rewound before being exposed. Therefore, once print film 10 is manufactured, it cannot be determined in which direction a negative film or print film 10 will actually be exposed. Thus, for 35 mm print film, for example, it is not certain at the time of manufacture whether analog sound track 18 and DTS sound track 26 run along the line of perforations 14 nearest one edge of print film 10 or the other. As is observable from the plan view of FIG. 2, frames 12 are skewed to one side of print film 10 relative to width W, rather than being centered, to accommodate audio sound track 18 and DTS sound track 26.

A practical watermark exposure scheme, particularly one that can be used for pre-exposure, must address the problems of uncertain placement of frames 12 relative to width W, which directly affects robustness and straightforward detection, and of the need for encoding analog and digital sound tracks 18, 22, 24, and 26.

For photosensitive media in general, it is known that a watermark encoding can be digitally added to the image frame at the time of printing. Currently, however, digital printing is much slower than conventional optical printing techniques. Thus, in a mass-production environment, it would be impractical to require an all-digital exposure system in order to apply a watermark to a motion picture print film.

Fortunately, it is possible to expose a watermark at different times during processing of the photosensitive medium. For example, as has been practiced and is described in U.S. Patent Application 2003/0012569 entitled "Pre-Exposure of Emulsion Media with a Steganographic Pattern" by Lowe et al., a latent monochromatic or polychromatic image can be exposed onto the "raw" photosensitive medium itself, at the time of manufacture. Then, when the medium is exposed to form the image, the image frame is effectively overlaid onto the watermark pattern. Such a method is also described in U.S. Pat. No. 6,438,231 entitled "Emulsion Film Media Employing Steganography" to Rhoads. The Rhoads '231 patent discloses this type of pre-exposure of the watermark onto the film emulsion within the frame area of negative film, for example.

It can be appreciated that watermark pre-exposure would have advantages for marking motion picture film at the time of manufacture or prior to exposure with image content. A length of motion picture film could be pre-exposed with unique identifying information, encoded in latent fashion, that could be used for forensic tracking of an illegal copy made from this same length of film.

Given these considerations, it can be seen that conventional approaches, such as simply applying a watermark pattern from one edge of film 10 to the other in all color planes, could yield unsatisfactory results, impairing image quality, degrading audio quality, complicating the coating emulsion design, adding cost, and compromising the robustness needed. At the same time, the watermark pattern for motion picture film media must have sufficient energy for detection in a copy of the projected film made using a camcorder device. Some improvement over conventional approaches is needed for providing watermark encoding that provides a good measure of robustness without introducing problems related to image and audio quality and that has minimal cost impact.

SUMMARY OF THE INVENTION

It is an object of the present invention to provide a method for exposure of a watermark that is particularly suited to the characteristics of motion picture film. With this object in mind, the present invention provides a method for recording a watermark pattern on a color recording medium that forms an image using a number N of colorants, the method comprising the step of forming the watermark pattern using at least two colorants, but fewer than N colorants.

It is a feature of the present invention that it takes advantage of a combination of imperfections that are inherent not only to the process of forming an image onto a color recording medium using colorants, but also inherent to the process of sensing the image thus formed using an electronic recording mechanism.

It is an advantage of the present invention that it provides a method of watermark application that has minimal impact on the analog soundtrack portion of a motion picture film.

It is a related advantage of the present invention that it eliminates the need, with a dye-only motion picture soundtrack, for a guard band or uniformly exposed area of the film to compensate for undesirable effects of exposure on the audio signal.

It is a further advantage of the present invention that it provides a method for optimizing printing speed when forming a watermark pattern that is exposed independently from image content exposure.

It is yet a further advantage of the present invention that it reduces the need for emulsion redesign over conventional watermarking methods that use all three color planes in a photosensitive medium.

It is yet a further advantage of the present invention that it provides, using only some, but not all, color planes, a watermark that is detected in each color plane of a recording made using a camcorder or similar device.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

It must be observed that the method of the present invention is directed to a watermarking scheme that is especially well-suited to photosensitive media used for motion picture imaging and having an encoded analog soundtrack. The detailed description given below focuses on application of the present invention to this type of media in a preferred embodiment. It must be noted, however, that the method of the present invention could be applied more generally to embodiments using any type of color recording medium that forms an image using a set of colorants. This invention could be applied, for example, to other types of photosensitive media that are coated with colorant dye-producing layers that respond to exposure energy at different wavelengths to form a color image, including still imaging films, for example. More broadly, the present invention could be applied to other types of color recording media that employ a set of colorants for forming an image, including media onto which colorant is applied, such as thermal imaging media or substrates used for ink jet printing.

Figure 1:
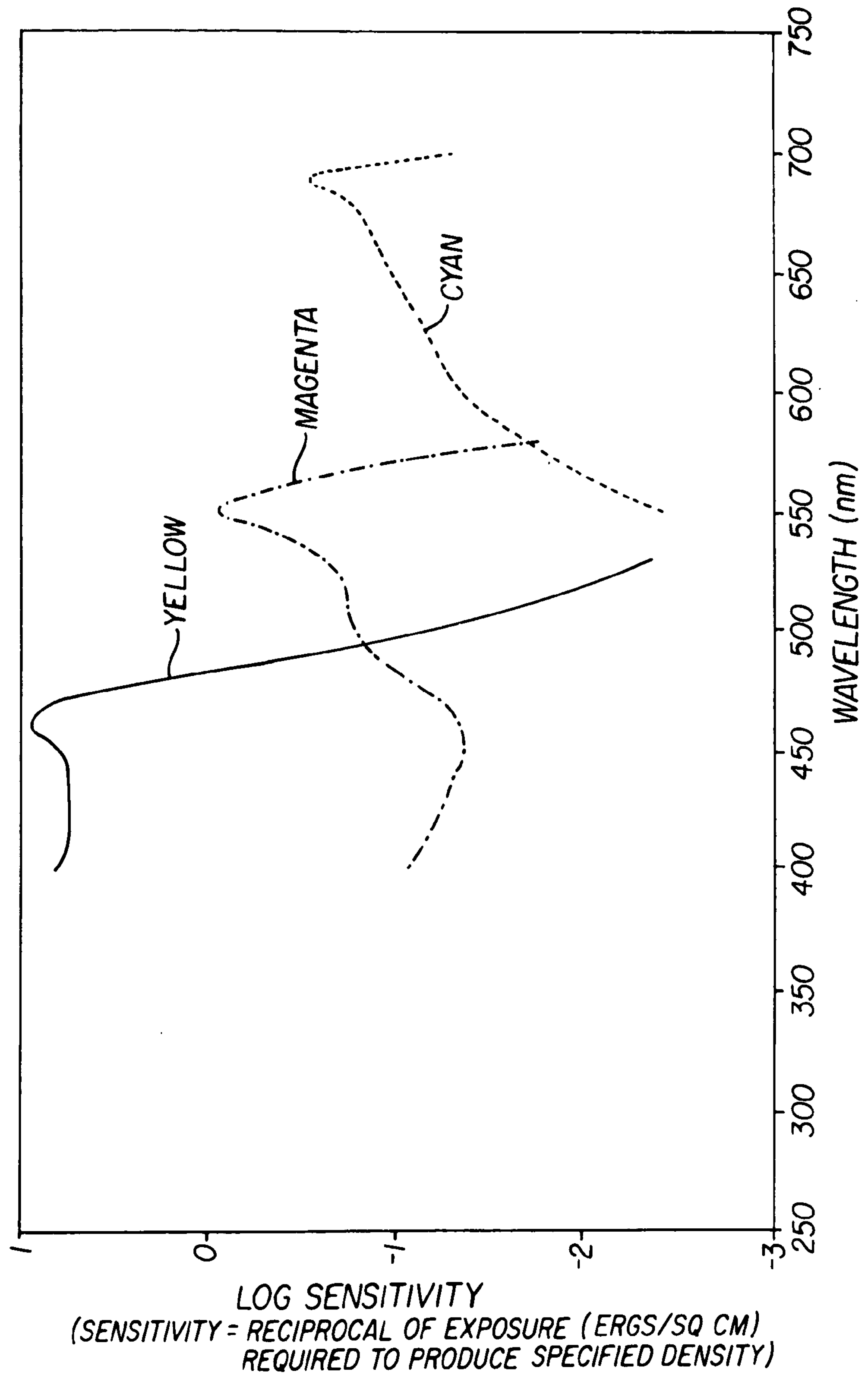
FIG. 1 is a graph showing the relative sensitivity of the three-color planes for a typical photosensitive color medium.
Figure 2:
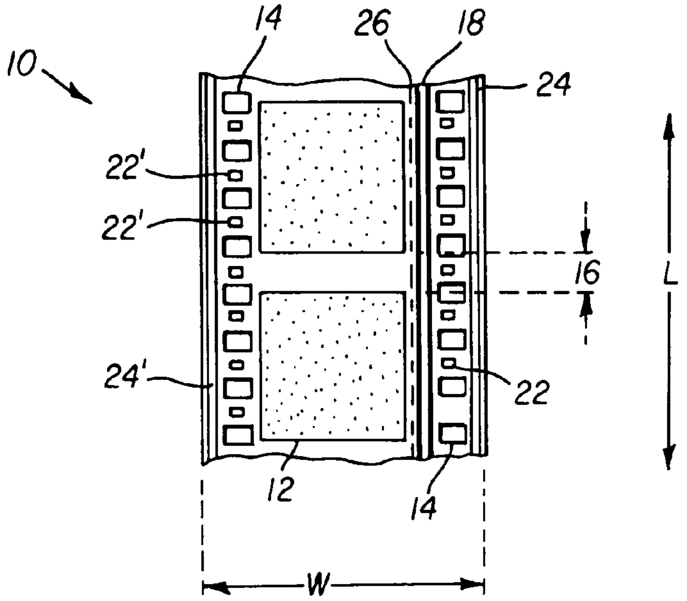
FIG. 2 (Prior Art)
FIG. 2 is a prior art plan view showing a typical arrangement of exposed areas on a motion picture print film.

Referring again to FIG. 2, it can be observed that analog sound track 18 is between perforations 14 and frames 12. It is instructive to note that the position of analog sound track 18 relative to frames 12 is not known at the time of motion picture print film manufacture. That is, with respect to the plane view of FIG. 2, it cannot be positively determined whether analog sound track 18 will lie to the right side of frames 12, as shown in FIG. 2, or on the left side. To compensate for this uncertainty, unencoded guard bands could be deployed to either side of a central watermarking band, as is disclosed in commonly assigned application entitled "Watermarking Method for Motion Picture Image Sequence" by Jones et al., U.S. Ser. No. 10/778,528, cited above. While this solution works well, however, there remains some risk of leaving some percentage of the area of image frame 12 without an encoded watermark. For motion picture print film using a dye-only sound track, the method of the present invention obviates the need for guard bands by providing a watermark that can be applied in the area of analog sound track 18, without noticeable impact on audio quality.

Figure 3:
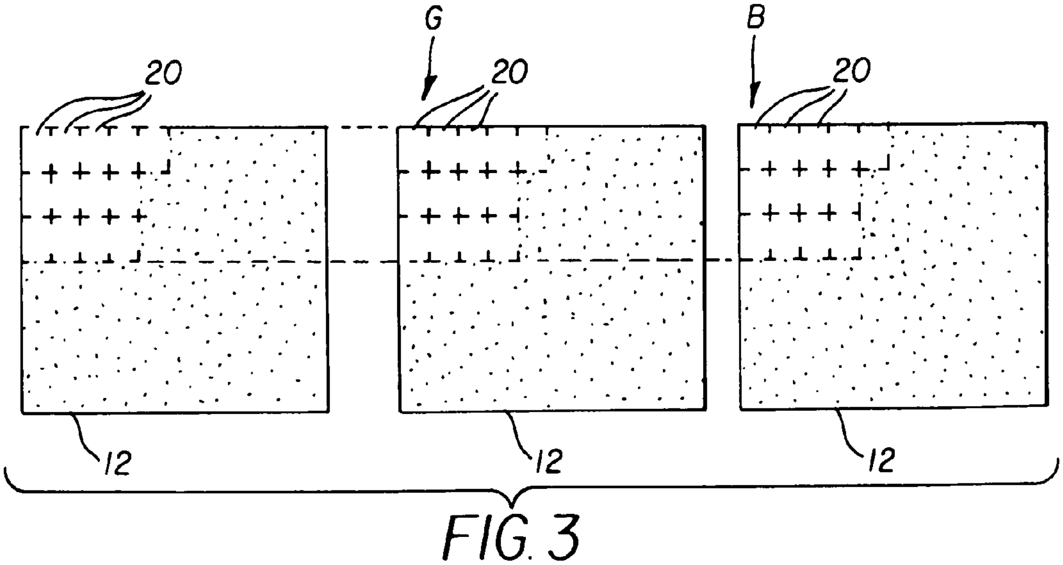
FIG. 3 is a plan view showing exposure of only two color planes for a color motion picture film.

As is represented in the plan view of FIG. 3, the method of the present invention exposes a watermark pattern to some, but not all, of the sensitized color planes of a photosensitive medium. In a preferred embodiment for motion picture print film, watermark encoding is provided only in Green- and Blue-sensitized color planes. These color planes correspond to magenta and yellow dye-producing layers, as is described in the background section above. The watermark pattern, typically a tiled pattern 20 as represented in FIG. 3, is not applied in the Red-sensitized color plane, that is, not in the cyan dye layer. With this arrangement, a robust watermark pattern is formed, without affecting the sensing requirements of analog sound track 18.

Use of the Blue-sensitized color plane (that is, of the yellow dye-producing layer) is advantageous for providing a watermark, since markings in this color plane are the least perceptible to the viewer. Marks made in the Green color plane (provided using the magenta dye-producing layer) have the advantage of being most easily extracted from an unauthorized copy, since this color plane has the most pronounced influence on the luminance signal that is processed by a camcorder. Empirical results have shown that a watermark provided only in Blue and Green color planes, without marking the Red color plane, provides sufficient energy for extraction, is below threshold perceptibility levels to a viewer, and is well suited to the motion picture environment. Moreover, empirical efforts show, as an unexpected result, that exposure of a watermark encoding in only two of the three dye layers of a color print film effectively provides a detectable watermark that is actually sensed in all three color planes that are obtained from a copy that is made using a video camera. There appear to be four primary principles that achieve this unexpected effect, as described following.

1. Imperfection in Dye Behavior

Figure 5:
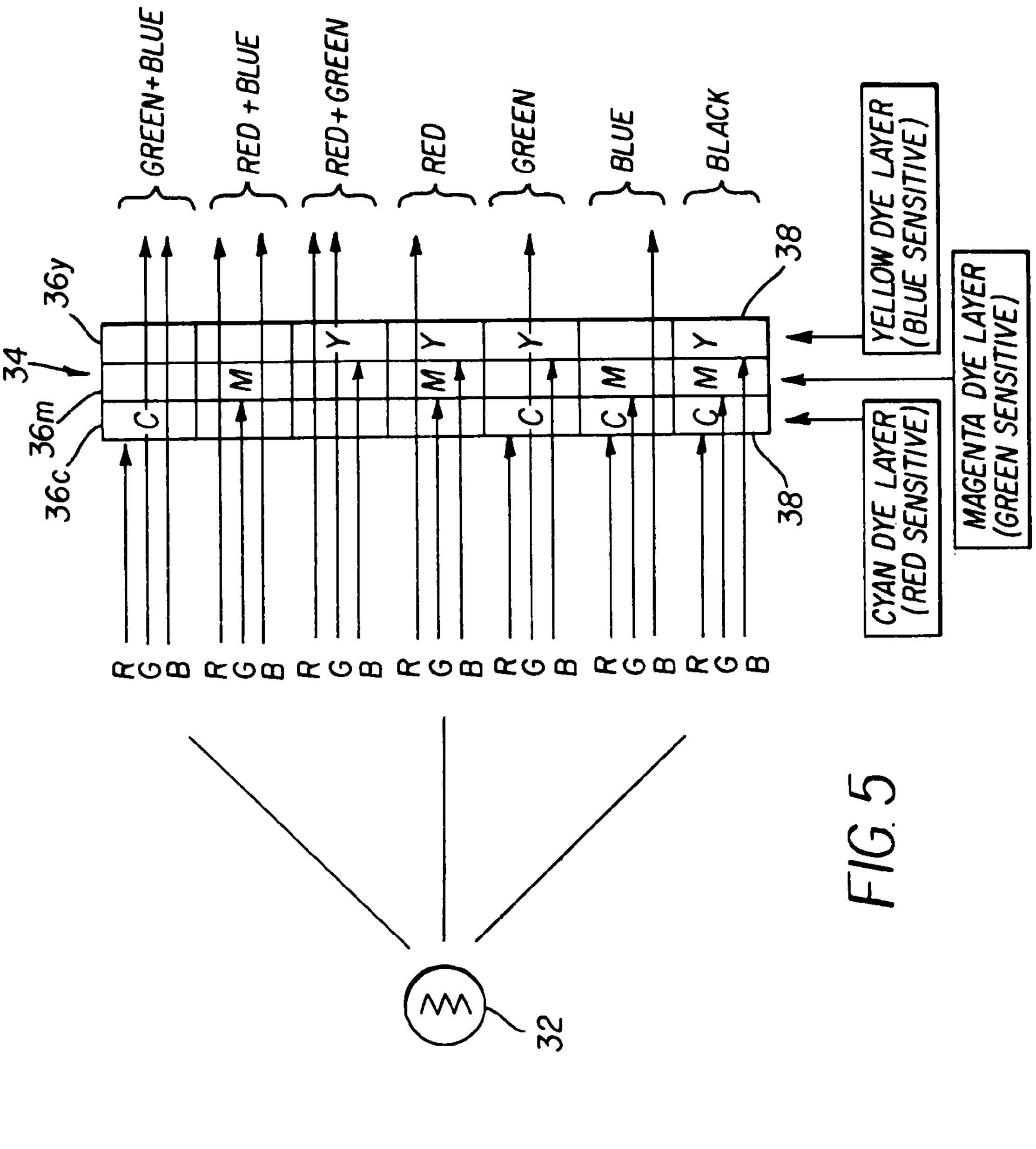
FIG. 5 is a schematic diagram showing how film layers provide color images from projected light.

In order to appreciate how the method of the present invention accomplishes this result, it is first instructive to review the process by which colors are projected from a color motion picture print film. Referring to FIG. 5, there is shown a schematic of the color projection process. A projection bulb, acting as a light source 32, emits white light toward a segment of processed print film 34. Processed print film 34 has three component colorants: a cyan dye layer 36*c*, a magenta dye layer 36 m, and a yellow dye layer 36*y*. The white light from light source 32 has Red, Green, and Blue spectral components, labeled R, G, and B in FIG. 5. The color of the light that passes through the processed print film 34, over an arbitrary area, is conditioned by the dye patches 38 in that area. FIG. 5 shows the result of light passing through various dye patches 38 and combinations of dye patches 38. For instance, cyan dye patch 38 allows transmission of Green and Blue light, blocking the Red light component, based on the relative density of dye patch 38. More accurately stated, to a first approximation, cyan dye patch 38 modulates Red, passing Green and Blue without modulation. Table I summarizes the ideal behavior of individual dye patches 38.

TABLE 1

Ideal Behavior of Dye Patches 38, By Color

| Dye Patch 38 of color: | Modulates: | Transmits: |
|---|---|---|
| Cyan | Red | Blue, Green |
| Magenta | Green | Red, Blue |
| Yellow | Blue | Red, Green |

Figure 6A:
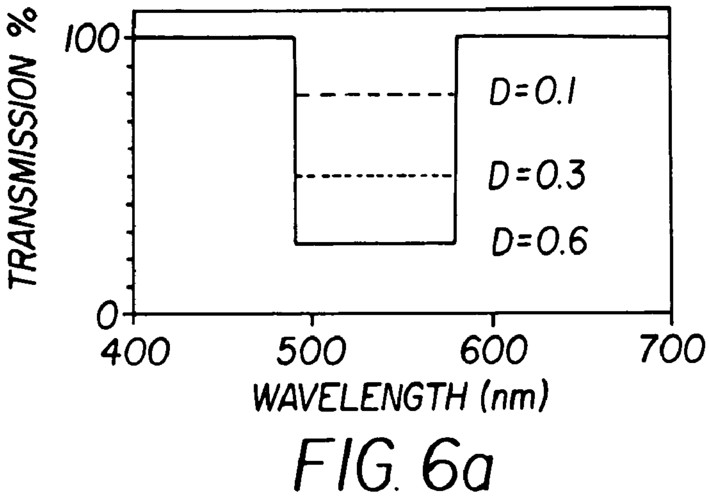
FIGS. 6*a* and 6*b* are graphs showing the ideal and actual transmission response characteristics, respectively, for magenta dye in a typical motion picture print film.

Referring to FIG. 6*a*, there is shown the ideal transmission of magenta dye patch 38 by wavelength, corresponding to the information in Table 1. That is, the magenta dye ideally has 100% transmission of Red light (nominally 580–700 nm wavelength) and 100% transmission of Blue light (nominally 400–490 nm wavelength). For Green light (nominally 490–580 nm), the Magenta dye modulates the light based on density, with typical density levels shown. Once again, however, it must be emphasized that this is a first approximation, with perfect (100%) transmission of Red and Blue light and with modulation only of Green light.

Figure 6B:
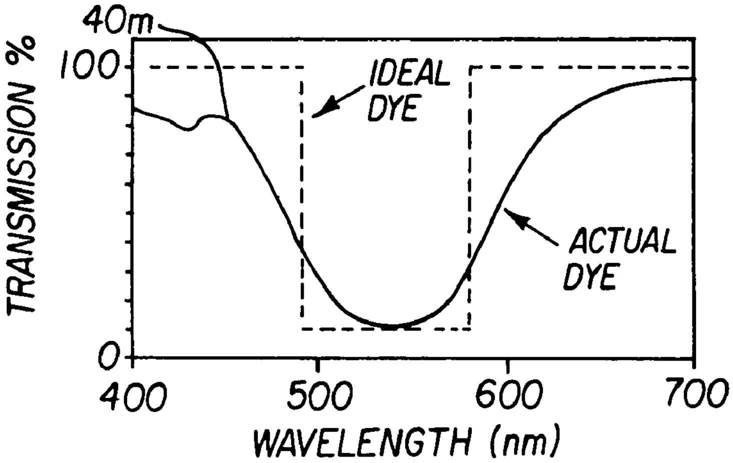
Figure 7:
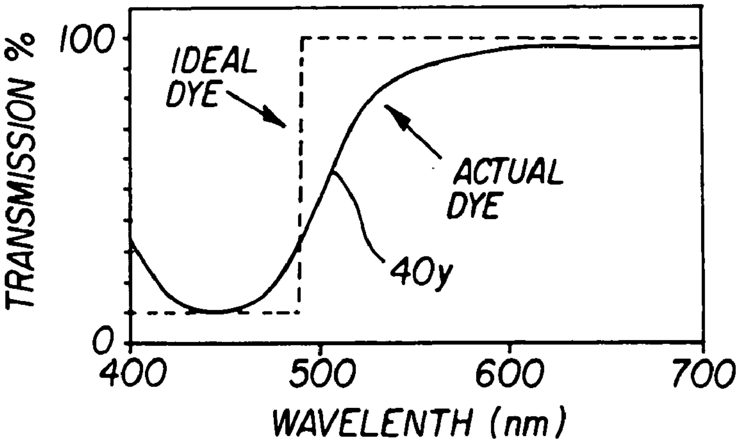
FIG. 7 is a graph showing the ideal and actual transmission response characteristics for yellow dye in a typical motion picture print film.

In practice, the actual behavior of magenta dye at density of about 1.0 deviates significantly from this ideal behavior, as is shown by an actual transmission curve 40*m* in FIG. 6*b*. That is, while transmission is high for Red and Blue light, it is not perfect but is, rather, somewhat less than 100%. Nor is modulation of Green light perfect, as illustrated in FIG. 6*a* and represented by a phantom waveform in FIG. 6*b*. Similarly, the actual response of yellow dye is also imperfect. Referring to FIG. 7, an actual transmission curve 40*y* for yellow dye at density 1.0 is shown and is compared with its ideal behavior, likewise represented in phantom in FIG. 7.

Thus, as FIGS. 6*b* and 7 show, the actual behavior of the dyes is not the ideal behavior shown in the first approximation of Table 1 and FIG. 6*a*. Instead, there can be significant leakage of light and modulation over a range of wavelengths due to dye imperfections. Even though emulsions can be formulated with tight wavelength tolerances, perfect transmission and modulation of the Red, Green, and Blue light is not provided in practice. In summary, it can be seen that this imperfect behavior of dye patches 38 in magenta and yellow dye layers 36*m* and 36*y* is one factor that allows modulation of all three Red, Green, and Blue color planes by exposing a watermark pattern in only two colorant dye layers (magenta and yellow in a preferred embodiment). Admittedly, this one factor may not be sufficient, by itself, to provide detectable modulation of the Red color plane; however, there are additional factors to be taken into account.

2. Spectral Mismatch Between Projected Color and Sensed Color

The second principle utilized by the method of the present invention relates to the nature of color sensing by video-camera circuitry and differences in spectral response of this circuitry relative to colors projected onto a display screen.

Figure 8:
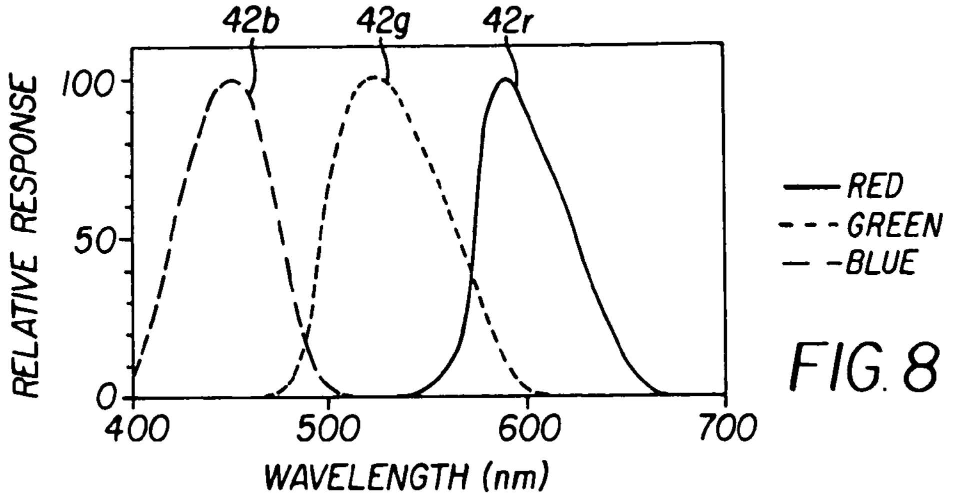
FIG. 8 is a graph showing spectral response characteristics of a typical video camcorder that might be used for obtaining an illegal recording from a projected motion picture film.
Figure 9A:
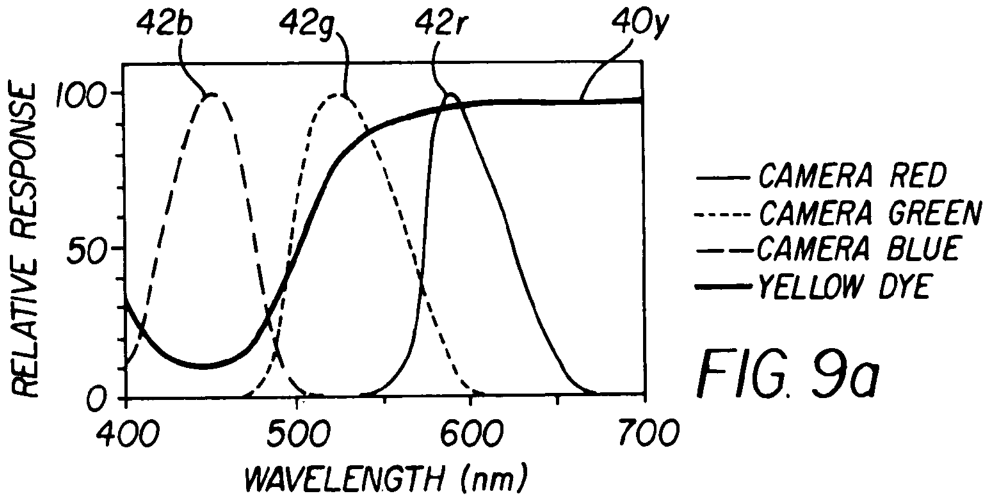
FIGS. 9*a* and 9*b* are graphs relating the spectral response characteristics of a typical video camcorder with the transmission characteristics of yellow and magenta dyes, respectively.
Figure 9B:
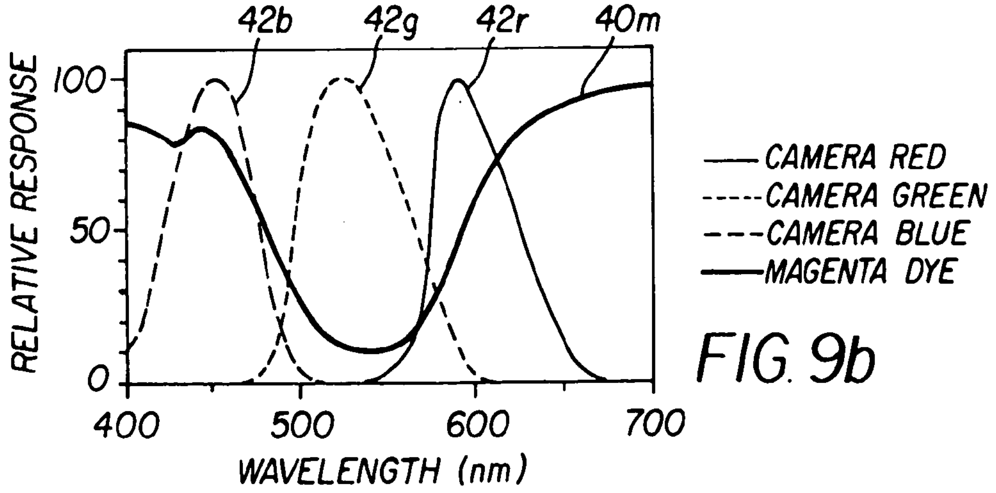

Referring now to the graph of FIG. 8, the typical spectral response of video-camera sensors is depicted. In FIG. 8, the relative response is plotted for color sensing components in the video camera, on a scale from 0 to 100, against wavelength. It can be seen that the actual spectral range of video-camera color sensing, a factor influenced primarily by the bandpass characteristics of the color filter array (CFA) used by the video-camera, is typically different from the spectral range of projected color film. For example, the peak sensitivity of video camera sensing components for the Red channel is nearest the short wavelength edge of the Red channel, typically about 580–590 nm. With respect to color, then, camcorder sensitivity in the Red channel is heightened somewhat for the Red-orange region. However, as is shown in FIGS. 9*a* and 9*b*, both yellow and magenta dye layers 36*y* and 36*m* (FIG. 5) actually perform some attenuation of Red wavelengths in the 580–590 nm region. This attenuation is particularly pronounced for the magenta dye over the Red-orange region.

Tables 2a and 2b illustrate the behavior of magenta and yellow colorant dye layers 36*m* and 36*y* relative to the signal sensed by a video camera. Ideal behavior of dye absorption and video camera spectral sensitivities is shown in the example of Table 2a. That is, Table 2a assumes perfect dye response (as was indicated in the theoretical graph of FIG. 6*a*) and well-matched spectral sensitivities of a video camera.

The more realistic behavior that is characteristic of actual dyes and an actual video camera is summarized in Table 2b. As the magenta entry shows, there is some unintended, but significant, modulation of the Red color channel by magenta dye layer 36*m*. Similarly, there is some unintended modulation of the Green channel by yellow dye layer 36*y*.

TABLE 2a

Behavior of Ideal Dyes and Matched Camera Spectral Sensitivities

| Dye Color | Modulates | Camera Output Signal |
|---|---|---|
| Magenta | Green | Green channel only |
| Yellow | Blue | Blue channel only |

TABLE 2b

Behavior of Actual Dyes and Actual Camera Spectral Sensitivities

| Dye Color | Modulates | Camera Output Signal |
|---|---|---|
| Magenta | Green + some Red | Green + Red channels |
| Yellow | Blue + some Green | Blue + Green channels |

Even where a CFA within the video-camera sensor could be more closely matched to the spectral characteristics of particular film dyes, there are necessarily batch-to-batch differences that would tend to defeat the most exacting calibration. Moreover, projector bulbs themselves can vary in relative output of Red, Green, and Blue spectral components, particularly due to bulb aging and other projection conditions.

While this spectral mismatch factor may allow only a small amount of energy leakage to the Red color channel when a watermark is applied only to magenta and yellow dye layers 36*m* and 36*y*, the additive effect of this factor plus the dye imperfections noted above can inadvertently contribute some amount of energy to the Red channel, in addition to the other factors noted here.

3. Video Camera Sensor Imperfections

As FIG. 8 clearly shows, spectral response curves 42*r* for Red, 42*g* for Green, and 42*b* for Blue peak at particular wavelengths, then decay within each color region, even allowing some overlap between adjacent spectral regions. This overlap means that, in practice, some amount of energy applied to the magenta dye layer 36*m* has impact in the Red channel. This imperfection in spectral response range of a video-camera effectively contributes additional energy to the Red color channel, particularly in combination with dye imperfections (1, above) and spectral peak differences (2, above).

Turning now to FIGS. 9*a* and 9*b*, spectral response curves 42*r*, 42*g*, and 42*b* are plotted relative to the transmission curves 40*m* and 40*y* for magenta and yellow dyes, respectively. As is readily apparent from the graphs of FIGS. 9*a* and 9*b*, there is clearly some appreciable imperfection in relative response, so that even where a watermark encoding is provided only in magenta and yellow dye layers 36*m* and 36*y* and not in cyan dye layer 36*c*, there is necessarily some impact on the Red color channel.

While this spectral response imperfection factor alone may not allow sufficient energy for detection of a low-level watermark exposure in all three color channels, the additive effect of colorant dye imperfection, noted as the first factor above, peak sensor spectral differences, noted as the second factor above, and spectral range imperfection and overlap necessarily causes some leakage of energy into the Red color channel. These three factors added together may allow detection of a low-level watermark in the Red color channel, where there is no attempt made to mark cyan dye layer 36*c*. However, there is still at least one more additional factor to be taken into account, as described following.

4. Video-camera Color Filter Arrangement and Compression

A fourth factor of primary importance for adding energy to the Red channel without modulation of cyan dye layer 36*c* relates to the nature of image sensing by the video-camera and standardized compression algorithms that are conventionally used by this type of recording device.

Figure 10:
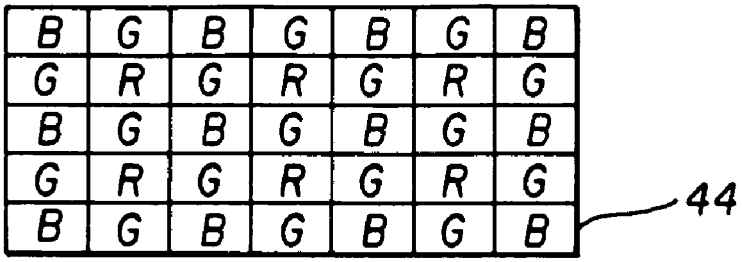
FIG. 10 is a plane view showing a typical arrangement of color filters for sensors in a video camera; and, FIG. 11 is a schematic view showing a motion picture camera outfitted to provide a watermark onto negative film according to the present invention.

The color filter array (CFA) of the video-camera is conventionally arranged in accordance with the color space modeling that is based on the luminance/chrominance paradigm familiar to those skilled in the color reproduction arts. For the purposes of this discussion, it is enough to observe that the luminance characteristic is highly correlated with the Green color channel. In fact, a conventional arrangement of the video-camera CFA uses a matrix of color filters that are heavily weighted toward detection of Green light. Referring now to FIG. 10, there is shown, as a plan view representation, a portion of a color filter array 44 that is conventionally used, by color, resembling the familiar Bayer pattern known to those skilled in the image recording arts. In color filter array 44, there are twice as many Green detector components than are used for either Red or Blue light.

By way of example, a standard luminance equation also shows the preponderant weighting given to the Green color channel, as follows:

$$Y=0.299R+0.587G+0.114B$$

where Y represents luminance.

The luminance signal is preserved with the highest fidelity when images are compressed using standard algorithms. At least some portion of the chrominance information, on the other hand, is subsampled and discarded by compression algorithms. Then, in order to reproduce the full RGB color signal for display, interpolation of the chrominance information is necessary for the transformation that converts from this luminance/chrominance representation to RGB representation.

As is well known to those skilled in the art of color modeling and transformation techniques, any type of transform between color models and interpolation within a color space requires some compromises and results in some amount of channel crosstalk. Therefore, as a result of imperfections in this color processing, some small amount of energy is likely to be added to the Red color channel, even where a watermark encoding is applied only to magenta and yellow dye layers 36*m* and 36*y*.

Any of the four factors noted above, taken singly, might not add sufficient energy to the Red channel to be measurable if a watermark were applied only to magenta and yellow dye layers 36*m* and 36*y*. However, the additive effect of these four factors has been shown capable of providing sufficient crosstalk between color channels to allow detection of a watermark in all three Red, Green, and Blue color channels, even where no watermark encoding is applied to cyan layer 36*c*.

Thus it can be seen that that additive effect of inherent imperfections in photosensitive dye response characteristics, of differences in spectral range and peaks between the projected image and video-camera componentry, of imperfections of video-camera detection, of color compression techniques, and of color modeling differences yields the fortuitous result that a watermark can be extracted from all three Red, Green, and Blue color channels when, in fact, only two colorant layers, preferably magenta and yellow dye layers 36*m* and 36*y* are so encoded. In this way, the method of the present invention takes advantage of accumulated imperfections and tolerance allowances in the film recording process and in the video-camera capture and recording process to provide an effective watermark scheme using a proper subset, that is, less than the full set, of dye colorant layers.

Figure 4:
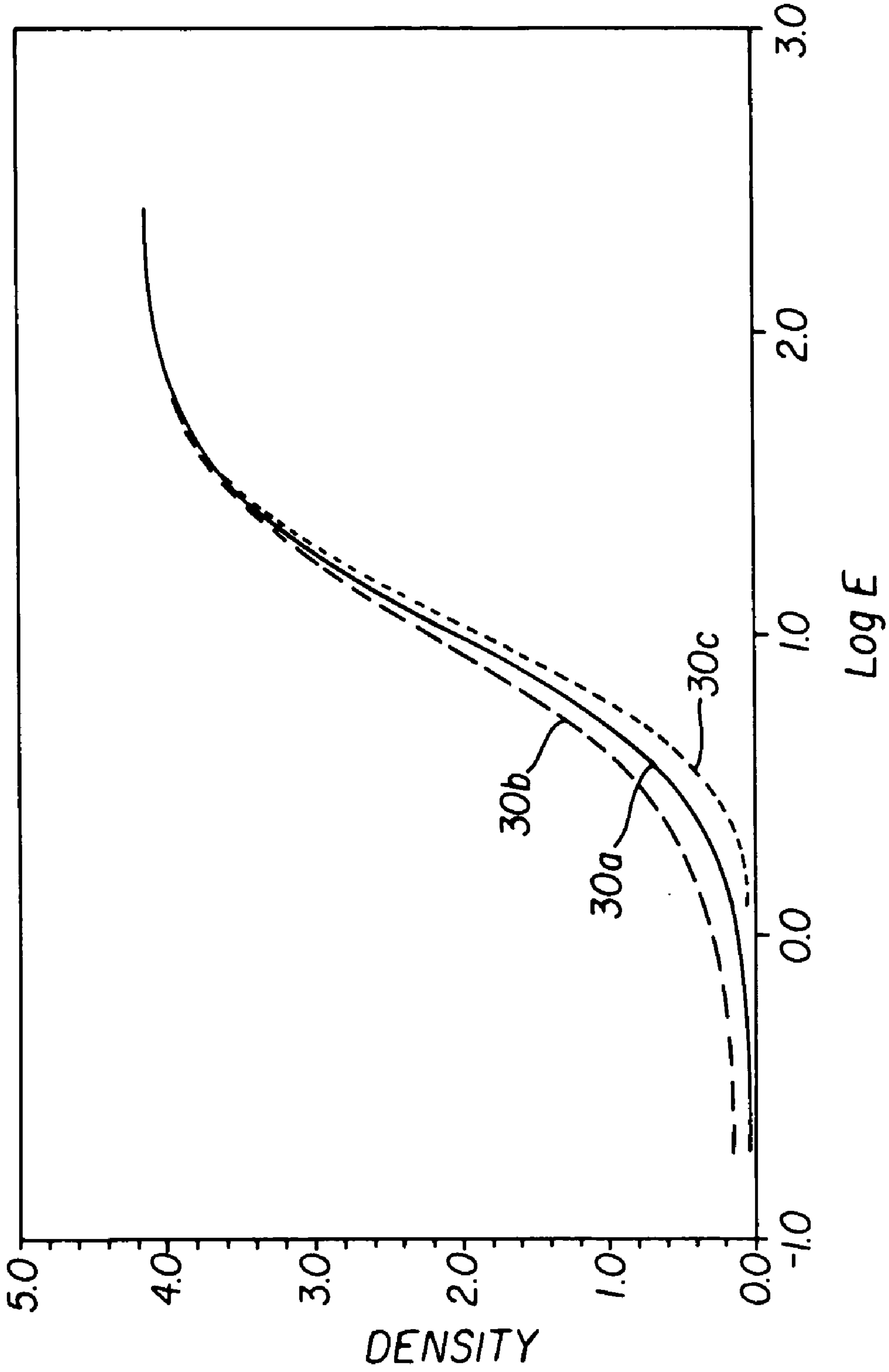
FIG. 4 is a graph showing the relationship of density to exposure for a sensitized layer in a color photosensitive medium with and without a watermark.

One advantage of the method of the present invention relates to the need to adapt the response characteristics of the photosensitive medium for accepting a watermark. Referring again to the D log E graphs of FIG. 4, it can be seen that, in order to maintain good color fidelity, it is necessary to re-formulate the photosensitive emulsion of a dye-producing layer to compensate for the added density of a watermark pattern. Curve 30*c* shows the affect achieved by re-formulation. Because the method of the present invention uses only two dye-producing layers, this method requires reformulation only for those layers. The sensitometric characteristics of the unaffected Red-sensitive layer (that is, of cyan dye layer 36*c*) need not be modified.

In a broader context, the method of the present invention could be applied to other types of photosensitive media, such as those used for still imaging, as was noted above. However, where there is no concern in interfering with audio soundtracks with still images, it may be more desirable to apply the watermark in an alternate proper subset of color planes, such as Red and Blue, for example, due to considerations of perceptibility by the viewer. That is, someone practicing the method of the present invention may choose to designate a different proper subset of color planes for watermark application, marking only the cyan and yellow colorant layers, for example, depending on the type of color recording medium and its use. It must be emphasized that the subset chosen is a non-empty proper subset (a subset which has at least one element but is not the entire set)

having at least two component colorants, since the full set of available colorants is not used.

This method could be broadly applied to photosensitive media having more than three color planes. For example, where a fourth visible dye layer is used in a photosensitive medium, it may be advantageous to apply a watermark to only two or three dye layers to achieve a similar effect.

While the embodiments described hereinabove are directed to marking photosensitive recording media that employ dye colorant layers, the method of the present invention could be more broadly applied to any class of color recording medium that employs a set of colorants to provide a color image. For example, the method of the present invention could be applied for colorants other than dyes, such as inks or pigments, for example. The set of component colorants may be contained within the color recording medium, such as with film, or may be applied onto the recording medium, such as from a donor or intermediate substrate or from an ink jet nozzle. The set of colorants used could be other than cyan, magenta, and yellow. The method of the present invention could also be applied where an applied exposure energy is visible or non-visible light and could also be used where heat or electromagnetic energy serves to expose image content, for example.

In general terms, then, for a color recording medium having a total number N of component colorant materials, the method of the present invention applies a watermark encoding to a number from 2 to (N−1) colorant materials. The colorant materials specified would be chosen based on their response characteristics, using information about attenuation of adjacent color channels and combined effects, as has been described in the present application.

A film manufacturer could apply the watermarking method of the present invention as a pre-exposure technique, prior to packaging the photosensitive medium for shipment. However, pre-exposure could alternately be performed by a studio before the negative film is exposed or by a lab, prior to printing a print film. In fact, the method of the present invention need not be constrained to pre-exposure. For example, a watermark pattern could be exposed onto a print film during or even after exposure to the image content of a frame.

Figure 11:
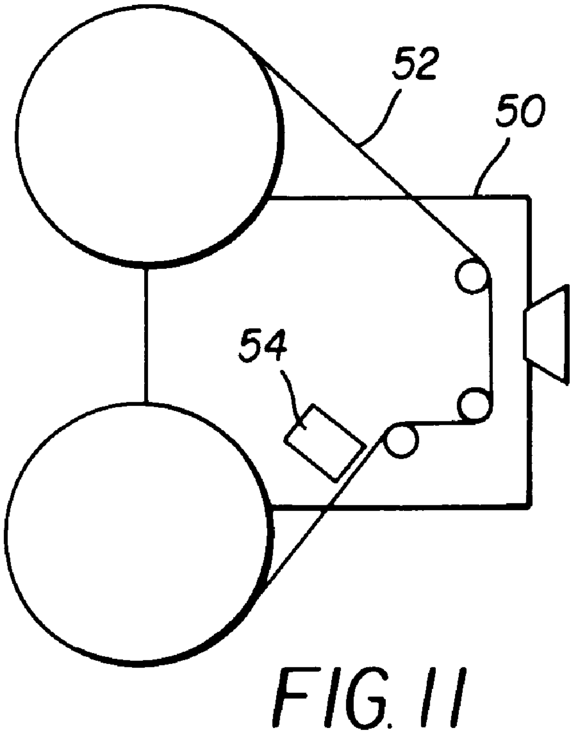

The method of the present invention could be carried out by any of a number of types of recording apparatus, at any of several points in the overall image processing chain. For example, some portion of the watermarking pattern could be exposed at the camera itself. For this purpose, as shown in FIG. 11, a motion picture camera 50 could even be provided with an exposure mechanism 54 for encoding a watermark pattern to a negative film 52 in specific color planes during a film shoot. Here, exposure mechanism 54 may employ an LED array, an LCD spatial light modulator, or other image-forming component for marking negative film 52 before or after image exposure. For exposure of the watermark pattern at the same time as an image is exposed, some type of beamsplitter surface would be required in the path of the exposing light. Again, with any embodiment of the present invention, the non-empty proper subset of colorant layers that are employed for encoding must be based on the type of medium and its application.

The invention has been described in detail with particular reference to certain preferred embodiments thereof, but it will be understood that variations and modifications can be effected within the spirit and scope of the invention. For example, the method of the present invention could be used in conjunction with any number of prior art techniques that apply a watermark pattern to motion picture content. The watermark pattern, encoded message, or message carrier could be changed over a length of motion picture film, using techniques known to those skilled in the art. Tiling could be used, as is familiar to those skilled in the art of watermark application.

With the solution of the present invention, a watermarking arrangement can be obtained that is well suited for a range of media types, including motion picture media as well as other types of still imaging film and paper. A watermark according to the present invention can be applied as a pre-exposure marking or applied during or after exposure to image content. Thus, what is provided is a method for marking a watermark pattern onto a color recording media, such as a motion picture film, by recording the pattern onto only a non-empty proper subset of the available color planes.

PARTS LIST

10. Print film
12. Image frame
14. Perforation
16. Interframe space
18. Analog sound track
20. Watermark tile
22, 22'. Digital sound track
24, 24'. Digital sound track
26. DTS (Digital Theater Systems) soundtrack
30*a*, 30*b*, 30*c*. Curve
32. Light source
34. Processed print film
36*c*, 36*m*, 36*y*. Cyan dye layer; Magenta dye layer, Yellow dye layer
38. Dye patches
40*m*, 40*y*. Transmission curve, magenta; Transmission curve, yellow
42*r*, 42*g*, 42*b*. Spectral response curve, red; Spectral response curve, green; Spectral response curve, blue
44. Color filter array
50. Motion picture camera
52. Negative film
54. Exposure mechanism
B. Blue
G. Green
L. Length
R. Green
W. Width

The invention claimed is:

1. A method for recording a watermark pattern on a color recording medium that forms an image thereon using a number N of colorants, where N is equal to or greater than three, the method comprising the step of forming the watermark pattern using at least two colorants, but fewer than N colorants, at each spatial location of the watermark pattern.

2. A method for recording a watermark pattern according to claim 1 wherein the step of forming the watermark pattern comprises the step of applying an exposure energy onto the color recording medium.

3. A method for recording a watermark pattern according to claim 1 wherein the color recording medium is a photosensitive medium.

4. A method for recording a watermark pattern according to claim 1 wherein the color recording medium is a motion picture negative.

5. A method for recording a watermark pattern according to claim 2 wherein the exposure energy is light.

6. A method for recording a watermark pattern according to claim 2 wherein the exposure energy is heat.

7. A method for recording a watermark pattern on a photosensitive color recording medium having at least a cyan colorant-producing component, a magenta colorant-producing component, and a yellow colorant-producing component, the method comprising the step of exposing the watermark pattern to both the magenta colorant producing component and the yellow colorant-producing component but not to the cyan colorant-producing component of the color recording medium at each spatial location of the watermark pattern.

8. A method for recording a watermark pattern according to claim 7 wherein the step of exposing is performed prior to exposure of the color recording medium to image content.

9. A method for recording a watermark pattern according to claim 7 wherein the color recording medium is a motion picture negative.

* * * * *